Patented May 1, 1951

2,551,232

UNITED STATES PATENT OFFICE 2,551,232

METHOD OF TREATING RESINOUS COATINGS AND ARTICLES RESULTING THEREFROM

Earl W. Balis and Herman A. Liebhafsky, Schenectady, N. Y., assignors to General Electric Company, a corporation of New York No Drawing. Application January 26, 1949, Serial No. 73,015

8 Claims. (Cl. 117—62)

This invention relates to the treatment of surfaces coated with various resinous compositions and more particularly relates to a process for treating surfaces coated with a synthetic resinous composition containing a residual group reactive with a hydrolyzable silicon-bonded halogen and selected from the class consisting of the —OH group and the amino group containing at least one nitrogen-bonded hydrogen, which process comprises exposing or subjecting the coated surfaces to the action of an atmosphere comprising an organohalogenosilane.

One of the objects of this invention is to decrease the tackiness of surfaces freshly coated with synthetic resinous compositions.

Another object of the invention is to improve the abrasion resistance of various surfaces coated with synthetic resinous compositions.

A still further object of the invention is to permit faster and easier handling of objects whose surfaces have been freshly coated with a synthetic resinous composition.

Other objects of the invention will become more apparent from the following description of the invention which is given by way of illustration rather than limitation.

We have discovered that all the foregoing objects, as well as other advantages, may be accomplished by subjecting surfaces freshly coated with synthetic resinous coating compositions to the vapors of an organohalogenosilane. In accordance with our invention, the surface it is desired to protect is coated with a resinous composition containing residual or uncombined groups reactive with a hydrolyzable silicon-bonded halogen, for example, reactive amino groups containing at least one nitrogen-bond hydrogen (such as, for instance, the

grouping, the

grouping), and reaction OH (hydroxyl) groups, with an organohalogenosilane. The treatment with the organohalogenosilane is preferably at normal temperatures, for example, from about 20 to 40° C. Although higher temperatures may be employed, it is desirable, in order to obtain smoothly coated surfaces as a result of our described treatment, that the temperature be below 100° C. If temperatures above approximately 100° C., for example 100° to 150° C., are employed for treating, for instance, oil-modified alkyd or oil-modified phenol-aldehyde resins which are normally non-wrinkling, it has been found that wrinkled finishes are obtained. Such methods of treatment are more particularly disclosed and claimed in the copending joint application of one of us, Earl W. Balis, and Lester B. Bronk, Serial No. 73,016, filed concurrently herewith and assigned to the same assignee as the present invention.

Among the organohalogenosilanes which may be employed in the practice of this invention may be mentioned, for example, alkyl halogenosilanes (e. g., methyl, ethyl, propyl, butyl, etc., halogenosilanes), the aryl halogenosilanes (e. g., phenyl halogenosilanes, etc.), aralkyl halogenosilanes (e. g., benzyl halogenosilanes, etc.), alkaryl halogenosilanes (e. g., tolyl halogenosilanes, etc.), compounds such as, for example, dimethylchlorosilane [$(CH_3)_2HSiCl$] and similar alkyl, aryl, etc., halogenosilanes, for example, chloro-, bromo-, fluoro-, etc., silanes. Instead of the vapors of the individual organohalogenosilanes, we may use mixtures of various organohalogenosilanes either alone or with, for example, silicon tetrachloride, for instance, the constant boiling or azeotropic mixtures of trimethylchlorosilane and silicon tetrachloride; mixtures of various methyl halogenosilanes, for example, a mixture of methyltrichlorosilane and dimethyldichlorosilane, etc. Treatment of the coated surfaces with silicon tetrachloride alone gave quite inferior results.

More particular examples of organohalogenosilanes which may be employed in the practice of the invention may be found, for example, in Patnode Patent 2,306,222, issued December 22, 1942, and Norton Patent 2,412,470, issued December 10, 1946, both of the aforementioned patents being assigned to the same assignee as the present invention. It is not essential that the organohalogenosilane or mixture of organohalogenosilanes employed normally be a gas; the only requirement is that it be convertible into a gas or vapor. For optimum results the chosen organohalogenosilane should have reasonable stability in the vapor or gaseous state. For many applications we prefer to employ methylchlorosilanes, Any of the many coating compositions (either with or without pigments, dyes, extenders, etc.) containing the aforementioned reactive groups may be employed in the practice of the instant invention. Among these may be mentioned ethyl cellulose, nitrocellulose, modified and unmodified alkyd resins including unsaturated alkyd resins, phenolic resins, for example, phenol-aldehyde compositions, organopolysiloxane resins, polyvinyl alcohol coating compositions, furfuryl alcohol resins, melamine-aldehyde resins, urea-aldehyde resins, aniline-aldehyde resins, melamine-aldehyde modified alkyd resins, urea-aldehyde modified alkyd resins, polyvinyl acetal modified phenolic resins (the term "phenolic" being intended to designate broadly both resins made from phenol and an aldehyde, for instance, formaldehyde, as well as resins from an aldehyde and a cresol, or a xylenol, etc.).

Where heat-convertible resins are employed as, for instance, in the case of heat-convertible alkyd, phenolic, etc., resins, the resin coating should be in the uncured or unconverted state, for example, in the A or B stage. Preferably, all resin-coated surfaces should be in the tacky state to permit interaction between the organohalogenosilane and the aforementioned reactive groups of the coated surface.

The term "modified" is intended to mean modification of basic resinous compositions with, for example, oils (for instance, drying, semi-drying, or non-drying oils, whether manufactured synthetically or obtained from natural sources), as well as modification by other types of resinous compositions of the basic resinous coating composition, etc. Additional descriptions of various modified and unmodified resinous coating compositions which may be employed in the practice of this invention may be found, for instance, in Ham application Serial No. 666,201, filed April 30, 1946, now Patent No. 2,491,811; Doyle et al. application Serial No. 787,624, filed November 22, 1947; Sage application Serial No. 794,443, filed December 29, 1947, now Patent No. 2,523,065; Jackson and Hall Patent 2,307,588, issued January 5, 1942; Rochow Patents 2,258,218–222, issued October 7, 1941, the foregoing patent applications and patents, which by reference are made part of this application, being assigned to the same assignee as the present invention. Particularly good results are obtained by employing oil-modified alkyd resins for coating various surfaces.

Any of a number of various methods may be employed for treating the coated surface with the vapors of the organohalogenosilane without departing from the scope of the instant claimed invention. One method comprises placing a pool of the organohalogenosilane on the floor of an air-tight chamber and placing the coated object in this chamber for a brief period of time, for example, from 30 seconds to about 3 minutes or more depending, for instance, upon the temperature in the treating chamber, the particular organohalogenosilane employed, the size of the object treated, the particular coating composition used, etc. Thereafter, it may be desirable, after removing the treated object from the chamber, to bake the treated object at elevated temperatures, for instance, at about 100° to 200° C., to drive off any residual hydrogen halide or organohalogenosilane, and to effect final curing of heat-curable resinous coating compositions employed in the particular application.

In order that those skilled in the art may better understand how the present invention may be practiced, the following examples are given by way of illustration and not by way of limitation. In each case the treating atmosphere comprised a mixture of chlorosilanes which, by volume, contained 33 per cent methyldichlorosilane and 67 per cent of an azeotropic mixture (see aforementioned Norton patent) of trimethylchlorosilane and silicon tetrachloride. This mixture will, for purposes of brevity, be referred to hereafter as the "chlorosilane mixture."

EXAMPLE 1

One 50 caliber steel cartridge shell was dipped in a 60 per cent solids xylol solution of a glycerylphthalate alkyd resin modified with linseed oil acids (designated as sample 1), another shell was dipped in a lead chromate pigmented oil-modified alkyd resin described in sample No. 1 (designated as sample No. 2), and another shell was dipped in an iron oxide pigmented 50 per cent solids xylol solution of a rosin-modified glycerylphthalate alkyd resin solution modified with a mixture of linseed and oiticia oil acids (designated as sample No. 3). Each of the alkyd resins contained a small amount of cobalt drier as cure accelerator. The shell casings were removed and given a five-minute bake at 150° C. to remove the solvent. This short bake can be omitted if desired. At the end of this time, the coated shells were cooled and while still tacky were placed in a chamber filled with vapors of the above-described chlorosilane mixture for about 2 to 3 minutes and removed. At this time it was noticed that the vapor process had removed all evidence of tackiness, that the surface was now hard and smooth, and the shell casings could be handled without their sticking to each other and could be stacked on each other and thereafter separated without any difficulty. Each shell casing was then baked for 30 minutes at 150° C. to complete the cure of the resin and then tested for abrasion resistance by means of the repeated scrape abrasion tester manufactured by the General Electric Company and described in the General Electric Review, volume 45, page 285 (1942), published by the General Electric Company at Schenectady, New York. As a control, samples of each of the shell casings were coated with the respective alkyd resins, treatment with the chlorosilane mixture omitted, and baked similarly as the foregoing three samples. Following are the results of abrasion tests at room temperature on the treated and untreated cartridge cases using the same loading in each case, namely, 1 kilogram. The thickness of the alkyd resin coatings was essentially the same in all cases:

*Table*

| Sample No. | Control | Treated with Chlorosilane Mixture |
|---|---|---|
| | Scrapes | Scrapes |
| 1 | 4 | 28 |
| 2 | 8 | 32 |
| 3 | 5 | 35 |

Each of the abrasion tests was conducted at a temperature of about 25° C. until the film on the surface of the cartridge case was broken down and electrical contact made with the metal undercoating which automatically stopped the abrasing test. The abrasion resistance of the treated surfaces at 100° C. was also much better than the abrasion resistance of control samples, from which treatment with the methylchlorosilane mixture was omitted.

EXAMPLE 2

In this example a soya bean oil acids modified glyceryl-phthalate alkyd resin which in turn was modified with about 10 per cent, by weight, of a melamine-fomaldehyde resin was used to coat a metal surface. The coated surface was baked at 150° C. for about five minutes to remove the solvent and thereafter placed in the air-tight chamber containing the vapors of the chlorosilane mixture for about 2 minutes and removed thereafter. Whereas before subjecting the coated surface to the vapor treatment it was tacky and sticky to the touch, it was now found that after such treatment the surface was dry, hard and smooth and could be handled without any difficulty at all.

EXAMPLE 3

A metal surface was coated with a resin similarly as in Example 2 with the exception that instead of using a melamine-formaldehyde resin as the modifying resin, a phenol-formaldehyde resin in the same weight ratio was employed. The treatment with the chlorosilane mixture was essentially the same as in Example 1 and the results were also the same.

EXAMPLE 4

A metal surface was coated with an alkyd resin similar to the one employed in Example 1 (sample No. 1) with the exception that 10 per cent, by weight, of a modifying phenol-formaldehyde resin was employed as part of the coating composition. The treatment was identical with that used in Example 1 and the final bake was also conducted at 150° C. for 30 minutes. The treatment with the chlorosilane mixture removed all evidence of tackiness.

EXAMPLE 5

A solution of an iron oxide pigmented chinawood oil modified para-tertiary butyl phenol-formaldehyde resin was used to coat a metal surface. The coated surface was baked at 150° C. for two minutes to remove the solvent, cooled and the tacky surface placed in the chamber with the vapors of the chlorosilane mixture for three minutes. The tackiness entirely disappeared and a dry dull surface was obtained indicating interaction between the resinous coating and the chlorosilane mixture.

EXAMPLE 6

A nitrocellulose lacquer modified with a glyceryl-phthalate resin which normally dried to a tack-free state in about one-half hour could be accelerated to reach the tack-free state by treating a surface coated with this lacquer with the chlorosilane mixture for from 15 seconds to 2 minutes.

It will be apparent to those skilled in the art that surfaces coated with resinous compositions other than those disclosed above in the foregoing examples and other organohalogenosilanes or mixtures of organohalogenosilanes, many examples of which have been given previously, may be employed in the practice of this invention without departing from the scope thereof.

Our claimed invention has many applications. For example, it is possible to treat freshly-coated tacky surfaces with an organohalogenosilane to render the said surfaces non-tacky and thereafter store the articles containing such treated surfaces in close proximity with each other without the necessity of immediately subjecting them to a baking step. At some future time the article may be removed from storage and the baking step conducted at that time. In connection with this, we have found in the case of oil-modified alkyd resins of the type described previously that after treatment with the organohalogenosilane, if the object having such a treated surface is permitted to age at room temperature for a period of the order of several months, the surface becomes cured to such an extent as to require no further baking operation. In addition, unexpectedly, the abrasion resistance of a surface treated in such a manner is improved about two to three fold over that of a surface which is baked after treatment with the organohalogenosilane.

The fact that the abrasion resistance of freshly coated surfaces can be improved in the manner described previously suggests many possibilities where our claimed invention may be employed. Thus, it may be possible to treat freshly coated electrical conductors with an organohalogenosilane prior to curing the insulation thereby to obtain insulated conductors which can be wound faster and with less care because of the improved abrasion resistance of the insulation.

What we claim as new and desire to secure by Letters Patent of the United States is:

1. The process which comprises (1) coating a surface with a resinous composition comprising an alkyd resin containing residual hydroxyl groups, (2) treating said coated surface, while the resinous composition is still in the tacky, uncured state, with the vapors of an organohalogenosilane until a substantially non-tacky state is attained, and (3) effecting final curing of the treated coated surface.

2. The process which comprises (1) coating a surface with an oil-modified alkyd resin containing residual hydroxyl groups, (2) subjecting the said coated surface while the aforesaid alkyd resin is in the tacky, uncured state, to the vapors of an organohalogenosilane until a substantially non-tacky state is attained, and (3) effecting final curing of the treated coated surface.

3. The process which comprises (1) applying an oil-modified glyceryl phthalate alkyd resin containing residual hydroxyl groups to a surface, (2) subjecting the coated surface, while the resinous coating is in the tacky, uncured state, to the vapors of a mixture of methylchlorosilanes until a substantially non-tacky state is attained, and (3) effecting final curing of the treated coated surface.

4. The process which comprises (1) coating a surface with a linseed oil acids-modified glyceryl phthalate alkyd resin containing residual hydroxyl groups, (2) subjecting the said coated surface, while the resinous coating thereon is in the tacky, uncured state, to the vapors of a mixture of methylchlorosilanes until a substantially non-tacky state is attained, and (3) effecting final curing of the treated coated surface.

5. A coated surface exhibiting improved abrasion properties obtained in accordance with the process described in claim 1.

6. A coated surface having improved properties obtained in accordance with the process described in claim 3.

7. A coated surface having improved abrasion resistance obtained in accordance with the process described in claim 4.

8. The process which comprises (1) coating a surface with an oil-modified glyceryl-phthalate alkyd resin containing residual hydroxyl groups, (2) subjecting the said coated surface while the resinous coating thereon is in the tacky, uncured state to the vapors of an azeotrope of trimethylchlorosilane and silicon tetrachloride until a substantially non-tacky state is attained, and (3) effecting final curing of the treated coated surface.

EARL W. BALIS.
HERMAN A. LIEBHAFSKY.

REFERENCES CITED

The following references are of record in the file of this patent:

UNITED STATES PATENTS

| Number | Name | Date |
|---|---|---|
| 1,893,611 | Bradley | Jan. 10, 1933 |
| 2,306,222 | Patnode | Dec. 22, 1942 |
| 2,386,259 | Norton | Oct. 9, 1945 |
| 2,439,689 | Hyde | Apr. 13, 1948 |
| 2,470,651 | Schaffel | May 17, 1949 |